G. D. KNAPP.
CUTTER BAR FOR MOWERS, REAPERS, AND CORN BINDERS.
APPLICATION FILED JAN. 12, 1915.
1,152,322.
Patented Aug. 31, 1915.
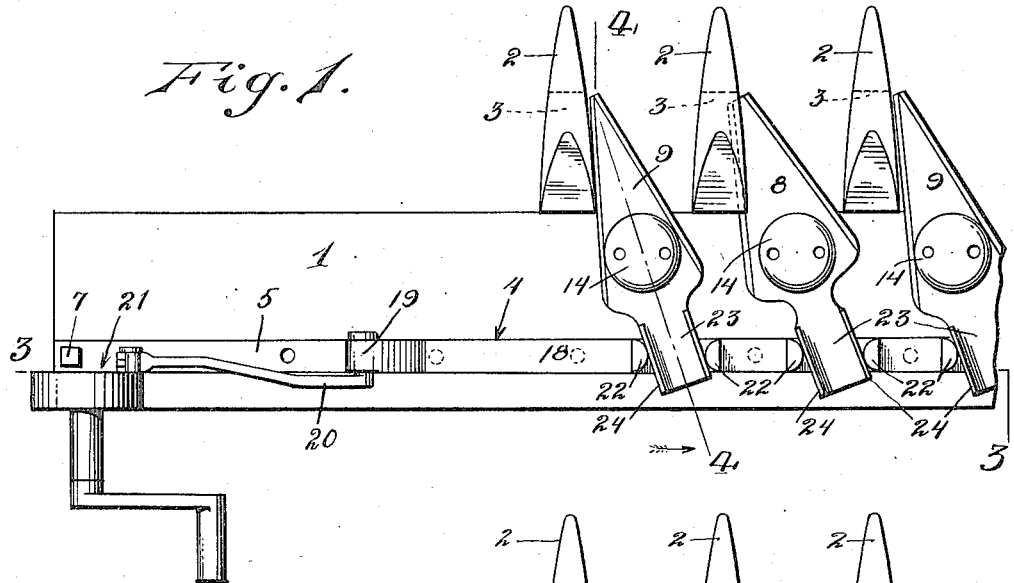
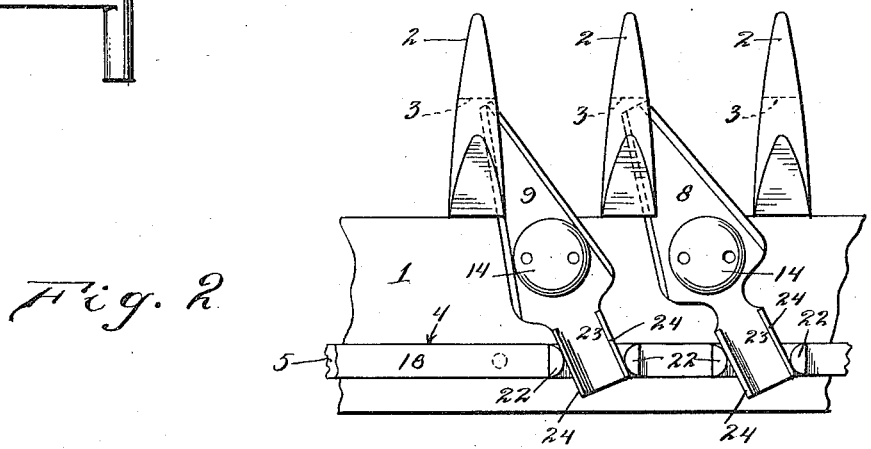
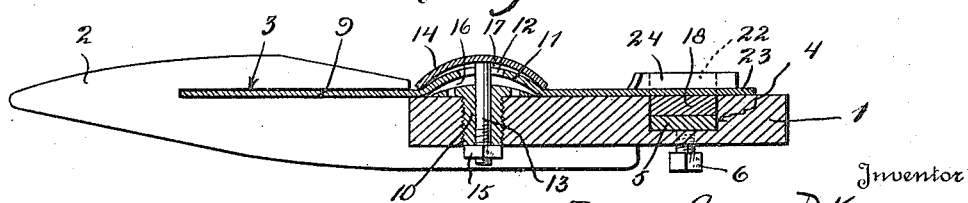
Inventor
George D. Knapp

UNITED STATES PATENT OFFICE.

GEORGE D. KNAPP, OF FREMONT, OHIO.

CUTTER-BAR FOR MOWERS, REAPERS, AND CORN-BINDERS.

1,152,322.   Specification of Letters Patent.   Patented Aug. 31, 1915.

Application filed January 12, 1915. Serial No. 1,790.

*To all whom it may concern:*

Be it known that I, GEORGE D. KNAPP, a citizen of the United States of America, residing at Fremont, in the county of Sandusky and State of Ohio, have invented certain new and useful Improvements in Cutter-Bars for Mowers, Reapers, and Corn-Binders, of which the following is a specification.

This invention relates to improvements in mowing devices for use in connection with reapers, mowers, and corn-binders, and more particularly to the cutting mechanisms thereof, and has for its object the provision of a cutter bar equipped with the usual knife guards and a plurality of knives associated therewith in the form of two sets arranged in alternation, one set performing its cutting action in advance of the other, whereby greater ease of operation is obtained.

An important object is the provision of a device of this character in which the knives are pivoted upon the cutter bar and actuated by a reciprocating rod driven by the usual pitman, and supported by an adjustable wear shoe, the knives being engaged by lugs on the actuating rod contacting with but free from the knives whereby the knives may be individually removed and replaced when broken.

Further objects and advantages such as simplicity in construction, cheapness in manufacture, efficiency and durability in service, together with the general improvement of the art will be more fully brought out in the following specification and illustrated in the accompanying drawing, in which:—

Figure 1 is a top plan view, broken away, of the cutter bar, constructed in accordance with my invention, showing alternately arranged wide and narrow knives, their arrangement on the finger-bar, and their connection with the knife operating bar, and also showing the narrow knives in position to commence cutting, while the broader blade has performed its cutting function; Fig. 2 is a similar view showing the position of the knives after the cutting operation has been effected; Fig. 3 is a longitudinal sectional view, taken on the line 3—3 Fig. 1, and, Fig. 4 is a cross sectional view, on line 4—4, Fig. 1, showing the means for mounting the knives on the finger-bar, and means for adjusting the knife operating bar.

Referring more particularly to the drawing, the numeral 1 designates the cutter bar to which are secured, in the usual manner, the knife guards 2 provided with the usual slots 3. The cutter bar 1 is provided with a longitudinal groove 4 within which is disposed a wear-shoe 5, which is engaged by adjusting screws 6 extending through the bottom of the cutter bar, for a purpose to be described, and which is secured against longitudinal movement by a screw 7 passing through the shoe and into the cutter bar. This shoe 5 is also provided with holes or recesses for the reception of a suitable lubricant.

The cutting mechanism comprises two sets of knives 8 and 9, the knives 8 being wider than the knives 9 and both sets of knives being arranged in alternation. The knives are pivoted upon the cutter bar 1, as shown in detail in Fig. 4, this pivotal connection being as follows: The bearing for each knife consists of a member 10 threaded through, or otherwise secured in, the cutter bar, and having a curved overhanging head provided with holes whereby it may be turned by a spanner. Each blade is pressed to form a curved depression 11 disposed over the head of the member 10, the depressed portion 11 being formed with a central opening 12 through which passes a screw 13 having a curved head 14 engaging the upper side of the depressed portion 11. The screw 13 is threaded through the member 10 and is provided below the cutter bar with a nut 15, or other suitable locking means. The curvature of the head of the member 10, the depressed portion 11, and the head 14, is such that spaces 16 and 17 are formed between these members. These spaces are adapted to be filled with grease. It will be observed that the knives may be vibrated freely and easily on account of their pivotal connections, as the bearing surfaces are very small.

The means for vibrating the knives back and forth for performing a cutting action comprises a longitudinally reciprocatory rod 18 disposed within the groove 4 upon the wear shoe 5 and provided at one end with any suitable socket member 19 for the engagement of a pitman 20 which may be driven by any suitable means, or by a crank movement such as indicated in the drawing by the number 21. The top face of the rod 18 is flush with the top of the cutter bar 1 and has a plurality of spaced lugs 22 extending upwardly therefrom. The rear portions of the knives are formed as extensions 23, the side edges of which are preferable, bent upwardly, as shown at 24. When the device is assembled the extensions 23 of the knives are disposed upon the top of the rod 18 with the edges 24 engaging the lugs 22, as clearly shown in Fig. 1. As the rod 18 is reciprocated by the driving means 21, the lugs 22 engaging the edges 24 will cause the knives to vibrate back and forth upon their pivots, as is evident.

The provision of two sets of knives, one set wider than the other, is an important feature of my invention. The difference in width is such that when the wider knives 8 have passed into the slots 3 in the guards 2 and have thus performed their cutting action, the narrow knives 9 will have their edges close to the edges of the guards 2 but not contacting therewith, and consequently not cutting. This arrangement insures that the set of wider knives 8 will cut in advance of the narrow knives, this cutting occurring slightly before the rod 18 has made its complete stroke. As the operation continues, and the rod 18 is moved to its maximum extent, the wider knives 8 will move farther into the slots 3 in the guards 2 and the narrow knives 9 will be moved so that their edges will move into the slots and perform their cutting action. By this arrangement of knives and operating parts, it will be apparent that as the device is operated, all the knives will be moved simultaneously while the sets of knives will cut in alternation, thus making it easier to operate the device as less driving power will be required.

In case a knife breaks or becomes dull it may be readily removed without disturbing any of the other knives. In order to accomplish this it is only necessary to remove the screw 13 by means of a spanner, the old knife removed and a new one substituted, as is evident.

In case of wear, the wear shoe 5 may be moved upwardly to take up any looseness by means of the adjusting screws 6 as is apparent.

The operating rod 18 may be readily removed without disturbing any of the knives, by removing the screw 7 and then pulling the wear shoe 5 entirely out of the groove 4. This removal of the shoe 5 will allow the rod 18 to drop down into the groove 4 whereupon the lugs 22 will lie in a plane lower than the extension 23 of the knives, and said rod 18 may be easily removed from said groove, as is evident.

From the foregoing description, taken in connection with the drawing, it will be apparent that I have provided a simple, novel, and efficient mowing device which is not apt to clog, which will be operated with a minimum expenditure of power, and in which the individual knives may be easily and quickly removed and replaced without disturbing the other knives.

Having thus described my invention, I claim:

1. In a mowing device, a cutter bar having knife guards thereon, a plurality of knives pivoted thereon and means for vibrating said knives back and forth, some predetermined knives being of greater width than others, said wider knives being adapted to co-act with the adjacent knife guards before said narrower knives co-act with the knife guards adjacent thereto, whereby said wider knives will cut sooner than the other knives when all of said knives are moved simultaneously.

2. In a mowing device, a cutter bar provided with knife guards, two sets of knives pivoted thereon, and means for vibrating said knives back and forth, one set of knives being wider than the other set and arranged in alternation therewith, said wider knives being adapted to co-act with the adjacent knife guards before said narrower knives co-act with the knife guards adjacent thereto, whereby the wider set will complete its cutting action before the narrower set commences.

3. In a mowing device, a cutter bar having knife guards thereon, a plurality of knives pivoted intermediate their ends between said guards, a groove in said bar, and a reciprocating driving rod therein, lugs on said driving bar adapted to contact with the ends of said knives to vibrate the same, and a removable shoe in said groove beneath said driving rod, whereby, by the removal of said shoe, said driving bar may be disengaged from said knives.

4. In a mowing device, a cutter bar having guards thereon, bearing plugs, adapted to set and be secured in suitable openings in said bar intermediate said guards, provided with rounded heads, knives, each having a seat therein, adapted to set over and upon said rounded heads, bolts, having cup heads, adapted to pass through said knives and plugs to hold said knives in pivoted position on said bar, and means for securing said bolts in position to hold said knives against displacement.

5. In a mowing device, a cutter bar having guards thereon, and screw threaded plug adapted to set into a suitable screw threaded opening in said bar intermediate said guards, and provided with a rounded head, a knife having a seat therein adapted to set over and upon said rounded head, and a bolt having a cuphead adapted to pass through said knife and plug to hold said knife in pivotal position on said bar, and means for securing said bolt in position.

In testimony whereof I have affixed my signature in presence of two witnesses.

GEORGE D. KNAPP.

Witnesses:
R. A. HUNSINGER,
JOHN J. LEHMANN.

Copies of this patent may be obtained for five cents each, by addressing the "Commissioner of Patents, Washington, D. C."